March 17, 1959  M. N. FAIRBANK  2,877,699
PHOTOGRAPHIC APPARATUS
Original Filed Nov. 4, 1948
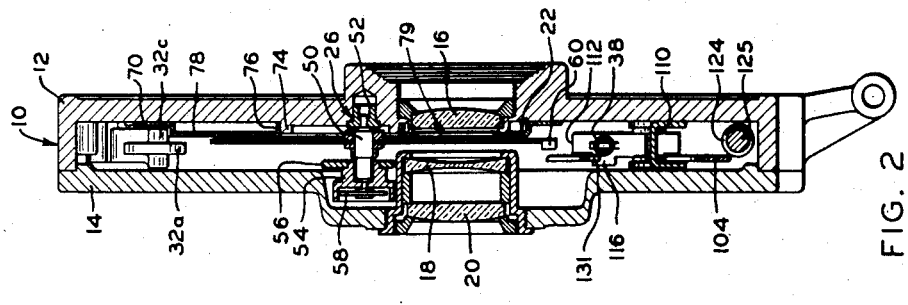
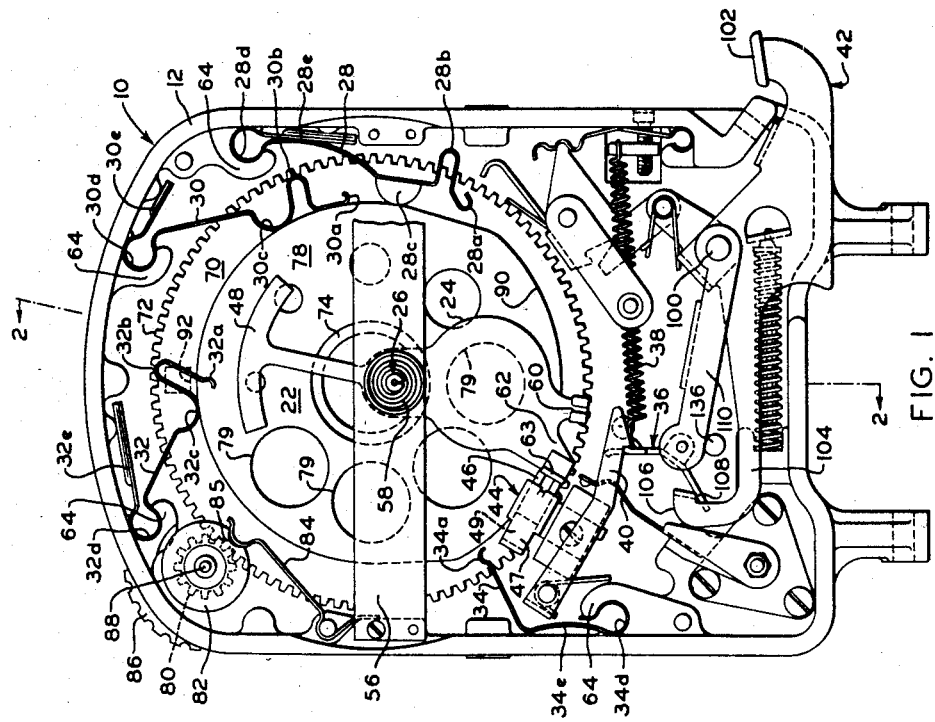
INVENTOR
Murry N. Fairbank
BY Brown and Mikulka
and Gerald Altman
Attorneys March 17, 1959 M. N. FAIRBANK 2,877,699
PHOTOGRAPHIC APPARATUS
Original Filed Nov. 4, 1948 2 Sheets-Sheet 2

INVENTOR
Murry N. Fairbank
BY Brown and Mikulka
Gerald Altman
Attorneys

United States Patent Office 2,877,699
Patented Mar. 17, 1959

2,877,699

PHOTOGRAPHIC APPARATUS

Murry N. Fairbank, Belmont, Mass., assignor to Polaroid Corporation, Cambridge, Mass., a corporation of Delaware Original application November 4, 1948, Serial No. 58,258, now Patent No. 2,662,457, dated December 15, 1953. Divided and this application April 29, 1953, Serial No. 351,917

5 Claims. (Cl. 95—59)

This invention relates to photography and more particularly to improvements in camera shutter and diaphragm assemblies.

This application is a division of my copending application, Serial No. 58,258, filed November 4, 1948, now Patent No. 2,662,457.

A principal object of the present invention is to provide an improved shutter and diaphragm assembly which is simple and cheap to manufacture and assemble.

Another object of the present invention is to provide a shutter comprising a rotatable mounted shutter blade and including an improved means for calibrating the means which control the speed with which the shutter blade is rotated.

A further object of the invention is to provide improved means for rotating a shutter blade of the above general type.

Still another object of the present invention is to provide, in a shutter of the type having a shutter blade which rotates at a substantially constant velocity, an improved means for controlling the degree of rotation thereof and thereby controlling the exposure time.

Still another object of the invention is to provide improved means for holding the shutter blade in its aperture-uncovering position when time exposures are to be made.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a diagrammatic plan view of a preferred form of the shutter and diaphragm assembly of the present invention, the rear housing and its associated lens elements being removed in Fig. 1 and the shutter assembly being viewed from the focal plane of the camera;

Fig. 2 is a sectional view of Fig. 1 taken along the line 2—2 but additionally showing the rear housing and the rear lens elements in their operative position;

Figure 4:
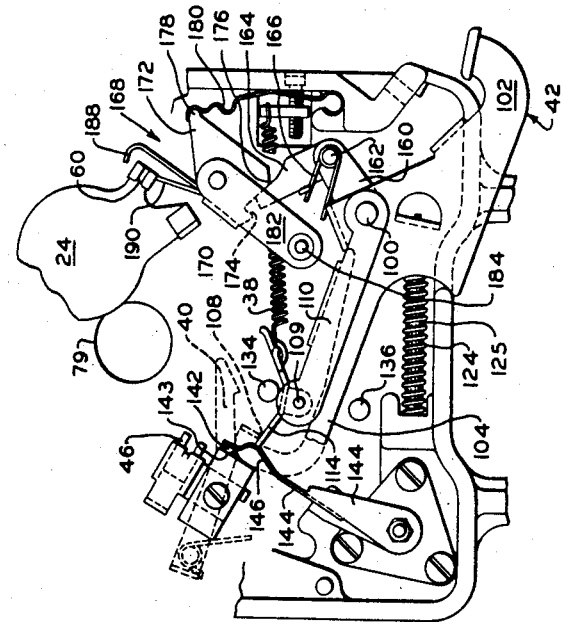
Fig. 4 is a fragmentary plan view of the shutter and diaphragm assembly of Fig. 1 where the shutter has just been rotated.

In general this invention relates to improvements in novel shutter and diaphragm assemblies of the general type described in Patent No. 2,531,936, issued on November 28, 1950 to myself and Sidney B. Whittier. In the preferred form of the invention the shutter blade is supported in operative relation to an exposure aperture, the shutter blade normally covering this aperture. The shutter blade is mounted so that it can be given an aperture-uncovering movement, this mounting preferably comprising a relatively friction-free bearing, the shutter being preferably free to rotate through an arc of approximately 300°. For imparting this aperture-uncovering motion, preferably a rotary motion, to the shutter blade, there is provided an impulse member or "kicker" which, in turn, is energized by a spring. The kicker is normally held in an inoperative position by a latch, the kicker spring being stressed when the kicker is so held. A tripping lever is arranged to release the kicker latch, thereby permitting the kicker to strike a portion of the shutter blade and to rotate this shutter blade at a substantially constant speed around its bearing from its stationary position to a position where the exposure aperture is uncovered. The extent of rotation of the shutter blade is then controlled so as to control the time during which the aperture is uncovered. In a preferred form, the shutter blade continues to rotate until a portion thereof hits a reversing means, this reversing means returning the shutter blade to aperture-covering position. A preferred type of reversing means comprises a bounce spring, this bounce spring intercepting and reversing the shutter blade at a predetermined point in its rotary travel. Thus the time during which the exposure aperture is uncovered depends upon the speed and arcuate travel of the shutter blade, this arcuate travel being preferably controlled by using a plurality of bounce springs positioned along the circumference of the arcuate path of that portion of the shutter blade which engages the bounce springs. These bounce springs are adjusted into and out of this path so as to reverse the shutter blade when in the path but to allow the shutter blade to pass when the bounce springs are out of the path. These bounce springs are preferably moved into and out of the shutter blade-engaging position by means of a single cam. The speed of rotation of the shutter blade depends upon its moment of inertia and the impulse given it by the kicker. In one preferred form of the invention this moment of inertia is kept constant, while the impulse is adjustable, at least for initial calibration of the shutter assembly.

The diaphragm, providing the exposure aperture, preferably comprises a disc having a plurality of openings arcuately spaced on the disc. The disc is mounted for pivotal movement within the shutter housing so that the various openings carried by the disc may be successively brought into coaxial relationship with the lens system. The cam, mentioned above, for controlling the operative and inoperative positions of the various bounce springs, is preferably formed as a unitary part of the diaphragm so that, when the diaphragm is rotated to position a desired opening adjacent the lens system, the cam is likewise rotated to move the various bounce springs into and out of their shutter blade-engaging positions.

Associated with the above-described shutter and diaphragm assembly is a time exposure latch which can be rendered operative to hold the shutter blade in a position where the exposure aperture is uncovered as long as the tripping lever is held in its tripping position. There is also included a novel flash bulb firing switch which is actuated, in a preferred form of the invention, by the kicker after the kicker has initiated rotation of the shutter blade.

Referring now to the various drawings, where like numbers refer to like elements in the different figures, the preferred constructional features of the present invention will be apparent. Referring particularly to Figs. 1 and 2, the shutter and diaphragm assembly 10 includes a front housing 12 and a rear housing 14. Suitably mounted in these two housings is a camera lens system comprising a front lens 16, a middle lens 18 and a rear lens 20. Positioned behind the front lens 16 and in front of the middle lens 18 is a diaphragm 22 and a shutter blade 24. This shutter blade is rotatably mounted on a suitable bearing, generally indicated at 26, this bearing preferably having a minimum amount of friction. Referring now more particularly to Fig. 1, it can be seen that there are provided a plurality of bounce springs 28, 30, 32 and 34 carried by the housing 12 and positioned adjacent the path of travel of a portion of the shutter blade during rotation of the shutter blade around its bearing as a center. For initiating rotation of the shutter blade there is provided a kicker, generally indicated at 36, this kicker being urged in a clockwise direction by a kicker spring 38, kicker 36 being held in the position shown by a latch 40. For releasing the latch 40 from the kicker 36 there is provided a tripping lever shown generally at 42. For normally holding the shutter blade in the position shown there is provided a retaining means 44 comprising, in a preferred form, a magnet 46.

A brief discussion of the operation of the shutter and diaphragm assembly described above will be helpful in an understanding of the detailed disclosure of the various elements to follow. In the use of the above-described modification of the invention, the tripping lever is actuated to cause the movement of the kicker 36 into position adjacent a lug 60 on the shutter blade. Continued movement of the tripping lever releases the latch 40 from the kicker, thus permitting the spring 38 to rotate the kicker rapidly in a clockwise direction. This rotation of the kicker is transmitted to the shutter blade which is rotated rapidly in a counterclockwise direction around its pivot 26. Rotation of the shutter blade in this counterclockwise direction uncovers an exposure opening 79 in the diaphragm 22, opening 79 being aligned with the lens system. This rotation of the shutter blade continues until lug 60 strikes the first bounce spring which is in the path of the shutter. As shown in Fig. 1, bounce spring 28 is in this path so that this is the bounce spring which reverses the direction of rotation of the shutter and thereupon returns the shutter blade to the position shown in Fig. 1. The magnet 46 engages and holds the shutter blade in this initial position, the diaphragm opening 79, aligned with the lens axis, being again covered by the shutter blade.

Construction of the shutter blade and magnet

Referring now more specifically to the construction of the shutter blade, it can be seen that the preferred modification thereof includes the opaque blade 24 and a suitable counterbalance 48, these portions being preferably connected together at the shutter blade axle 50. As seen best in Fig. 2, the axle has one bearing 52 carried by the front housing 12 and another bearing 54 which is carried by a cross bridge 56. That end of the shutter axle 50 associated with the second bearing 54 is preferably connected to bearing 54 by means of a hair spring 58. Adjacent one end of the shutter blade and counterbalance assembly, there is provided an impulse-receiving and bounce spring-engaging portion. This portion preferably comprises the lug 60, the left (Fig. 1) side of which is adapted to receive a rotating impulse from the kicker 36 and the right side of which engages the various bounce springs. A second lug 62 is somewhat arcuately spaced from the kicker-engaging lug 60 and comprises a magnetic portion 63 adapted to engage the magnet 46 when the shutter is in, or returned to, the position shown in Fig. 1.

The magnet 46, which normally maintains the shutter blade in the position shown, is frictionally mounted in a magnet holder 47, this magnet holder also supporting a block 49 of yielding material, such as sponge rubber, in shock-absorbing relationship to the magnet so as to permit the magnet 46 to move slightly and thus absorb the kinetic energy of the shutter blade when this shutter blade returns to its position of rest.

The bounce spring

In a preferred form, bounce springs 28, 30, 32 and 34, mentioned previously, comprise portions 28a, 30a, 32a, and 34a, respectively, which are adapted to engage the shutter blade lug 60 during its rotation. The bounce springs also comprise resilient portions 28b, 30b, 32b, and 34b, these portions being preferably arranged so that their respective blade-engaging portions 28a, 30a, etc. travel in a path which is substantially tangential to the path of shutter blade lug 60, both when absorbing energy from the shutter blade and when transmitting energy to the shutter blade. Each of bounce springs 28, 30 and 32 also respectively includes a cam-engaging portion 28c, 30c and 32c. Since bounce spring 34 is not moved by a cam it does not contain any cam-engaging portion. For predeterminedly positioning the bounce springs, the shutter housing preferably includes a plurality of supports, comprising lugs 64, adapted to engage circular bounce spring portions 28d, 30d, 32d and 34d, respectively. Each bounce spring additionally includes a separate arm adapted to bear against the shutter housing and resiliently hold the cam-engaging portions 28c, 30c, etc. against the cam, these arms being shown at 28e, 30e and 32e, respectively. A portion 34e predeterminedly positions spring 34. As can be seen best from an examination of Fig. 2, the outer end of each bounce spring is relatively narrow, thereby being readily easily deflected by the shutter blade. However, the remaining portions of each bounce spring (for example, portions 32c, etc.) are relatively wide as seen in Fig. 2. This construction serves several very useful functions. In the first place, it imparts rigidity to the bounce springs. In the second place, these wide portions are made wide enough so that they extend between the front housing and the rear housing and may thereby hold the bounce springs against movement with respect to support lugs 64 by engaging the two housing members. Lastly, these wide portions of the bounce springs may be used to hold the diaphragm 22 in position.

The diaphragm

The diaphragm, which is generally indicated at 22, comprises a disclike element mounted for rotation around its axis and with its axis parallel to the lens axis. The diaphragm has a peripheral portion in one plane and a central portion in another plane, the various diaphragm exposure openings or apertures being preferably formed in the central portion. As seen best in Fig. 1, the peripheral portion 70 has a number of gear teeth 72 on the circumference thereof. Diaphragm 22 is mounted for rotatable movement by means of a boss 74 (Fig. 2) preferably formed in the front housing 12, this boss being engaged by a forwardly extending diaphragm flange 76. Diaphragm 22 also includes a central portion 78 having a plurality of openings 79 formed therein. The center of each opening 79 is preferably arcuately spaced by an equal distance from the center of each adjacent opening 79. By rotation of the diaphragm 22, the openings 79 may be successively predeterminedly aligned with the axis of the lens system. For rotating the diaphragm 22, there is provided a gear 80 meshing with the diaphragm gear teeth 72. This gear 80 is mounted on a shaft 88, as is cam 82. Thus cam 82 rotates as a unitary structure with the gear 80. A cam-engaging detent spring 84 is positioned to engage a cam detent notch 85 associated with the gear cam 82. A knurled disc 86, carried by the shaft 88, preferably extends to the exterior of the shutter housing to enable the camera user to rotate the gear 80.

The diaphragm 22 also includes a cam surface portion 90 which is formed at the junction between the peripheral portion 70 and the central portion 78. This cam surface portion 90 engages the portions 28c, 30c and 32c of the corresponding bounce springs and serves to move these bounce springs out of shutter blade-engaging position. With the cam surface portion 90 in the position shown in Fig. 1, all of the bounce springs 28, 30, 32 and 34 are in their shutter blade-intercepting position. When the diaphragm 22 is rotated in a counterclockwise direction through 45° (one-eighth of the diaphragm circumference) the cam follower portion 28c, of bounce spring 28, is engaged and the engaging portion 28a of this bounce spring is moved out of the path of the shutter blade. When this diaphragm 22 is now rotated another 45°, the cam portion 30c of bounce spring 30 is engaged and moved outwardly, thereby moving engaging portion 30a of this bounce spring out of the path of the shutter blade. A further 45° rotation of the cam will move portion 32a of bounce spring 32 out of the path of the shutter blade. When the cam 90 is in this last position and the shutter blade is rotated by the kicker 36, the shutter blade will swing through almost a 300° arc of travel until lug 60 engages portion 34a of bounce spring 34. This last-mentioned position of the cam 90 thus gives the longest time during which the exposure aperture is uncovered by the shutter.

In a preferred form of the invention the diameter of the gear 80 bears the ratio $$\frac{x}{n}$$

to the diameter of the diaphragm gear 72, where $x$ is the number of cam notches 85 and $n$ is the number of diaphragm openings 79. Since there is preferably one cam notch 85 and there are eight diaphragm openings 79, the gear 80 is one-eighth of the diameter of the diaphragm gear 72. With this arrangement, one complete rotation of the gear 80 rotates the diaphragm 45° and thus moves one opening 79 in the diaphragm out of alignment with the lens system and moves the next opening 79 into alignment with the axis of the lens system. In this way, the cam notch 85 indicates to the user of the shutter assembly that one of the diaphragms is in proper position. For ascertaining the relative angular position of the diaphragm, and thus ascertaining which of the openings 79 is aligned with the lens axis, a window 92 is provided in the front housing. This window 92 is so arranged that indicia printed on the front surface of the peripheral portion 70 of the diaphragm may be successively brought into view. It will be apparent that these indicia may conveniently run from 1 through 8 (the number of openings 79), these indicia corresponding to predetermined light values. Thus, for example, a number "1" may correspond to a maximum size of opening 79 plus the longest exposure time. Number "2" may correspond to a maximum size of exposure opening and a somewhat shorter exposure time, etc. It should be understood that the above-described gear ratio of 8 to 1 is of course subject to considerable modification. For example, if nine openings 79 were provided, the gear ratio would preferably be 9 to 1. If two notches 85 were provided, the gear ratio could be halved, as explained above.

*Tripping lever, kicker assembly and kicker latch*

Figure 3:
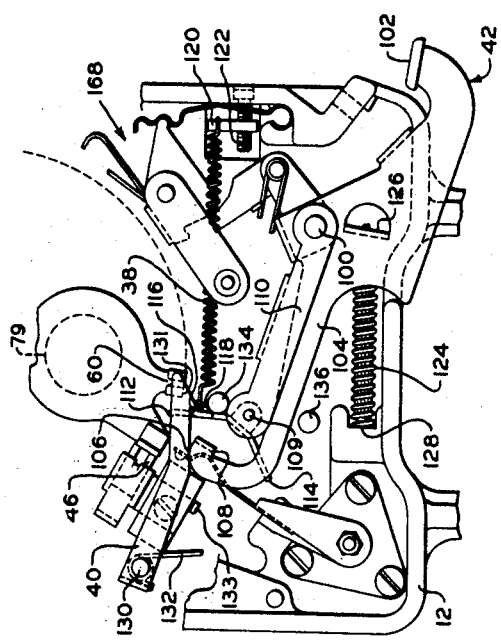
Fig. 3 is a fragmentary plan view of the shutter and diaphragm assembly of Fig. 1 with the elements thereof positioned so that the shutter blade is just about to be rotated.

The kicker, tripping lever and kicker latch are shown best in Figs. 1, 3 and 4. In a preferred form, kicker 36 is carried by an arm 110 pivotally mounted with respect to the housing. Spring means bias this arm towards the shutter blade and also bias the kicker in its impulse-imparting direction. The kicker latch holds the kicker against the bias of the spring means and the tripping lever, through the kicker, holds the kicker-carrying arm against its bias. Thus the kicker is held against rotation and also spaced from the shutter blade. In a preferred form, a cocking spring is employed with the tripping lever 42 for overcoming the bias of the above-mentioned bias spring means. In Fig. 1 the various elements are shown in the position as normally held by the cocking spring, in Fig. 3 the elements are shown with the kicker just about to rotate the shutter blade and in Fig. 4 the kicker has been released and has rotated the shutter blade. As seen in these figures, the tripping lever 42 is mounted for pivotal movement around a pivot pin 100. Lever 42 comprises an actuating portion 102, which extends to the exterior of the shutter housing, and a latch release arm 104. On the end of arm 104 there is provided a first surface portion 106 which is adapted to engage the edge of latch 40 so as to move latch 40 with respect to the kicker 36 and thus release the kicker. Arm 104 also includes a second surface portion 108 which is adapted to engage a portion of the kicker as will be hereinafter described. The kicker 36 is secured, by means of a pivot pin 109, to an arm 110 which is preferably pivotally mounted on the same pivot pin 100 which mounts the tripping lever 42. The kicker 36 preferably includes two arms, one of these arms 112 being that portion of the kicker which is adapted to engage the lug 60 on the shutter blade. The other arm 114 serves the dual function of being engaged by the tripping lever surface 108 and also of actuating the flash contact in a manner to be described hereinafter. Kicker arm 112 has a tab 116 thereon which engages latch 40. The kicker 36 also includes a hook 118 to which is secured the kicker spring 38. The other end of the kicker spring 38 is secured to a block 120, this block in turn being supported by a screw 122 for adjusting the position of the block and thereby the tension on the spring 38. Tripping lever 42 also has associated therewith a relatively strong cocking spring 124, one end of which bears against a turned-down tab 126 preferably punched from tripping lever 42. The other end of the cocking spring 124 is received in a depression 128 conveniently formed in the front housing 12. An internal cylinder 125 serves to reinforce the cocking spring 124.

For limiting rotation of the kicker-carrying arm 110 around the pivot pin 100, there are provided two stops, one of these stops being indicated at 134 and the other being indicated at 136, the kicker-carrying arm 110 being shown in Fig. 1 as abutting against stop 136, this being the normal position for the various elements at rest.

The latch 40 is preferably pivotally mounted by means of a pivot pin 130, the outer end of the latch including a hook 131 which engages the tab 116 on arm 112 of kicker 36 and thus prevents clockwise rotation of the kicker around its pivot. A bias spring 132 is provided adjacent the pivotal mounting of the latch 40 so as to normally urge the latch in a clockwise direction around its pivot pin, a stop 133 being provided for limiting this rotation of the latch 40.

*The flash synchronizer*

The flash synchronizing mechanism is preferably so arranged with respect to the kicker that a portion of the kicker, after it has transmitted rotational movement to the shutter blade, causes the closing of the flash bulb firing switch to initiate the flash. In a preferred form of the invention, the various elements of the flash synchronizing mechanism are so arranged that they absorb a certain amount of the kinetic energy of the kicker and also provide positive closing of the flash bulb circuit without danger of reopening of the circuit before the flash is completed. This flash synchronizing mechanism comprises a flash contact 142 which, when it engages a ground contact 143, energizes the flash bulb. The flash contact 142 is carried on the end of a resilient conducting arm 144, this arm having an inclined surface 146 which is engaged by arm 114 of the kicker 36 after the kicker 36 has transmitted its kicking impulse to the shutter blade. Inclined surface 146 makes a slight angle with the tangent to the path followed by the end of kicker arm 114, thereby preventing direct normal impact of arm 114 on surface 146 and consequently eliminating bouncing of the arm 114 after initial contact with surface 146. The conducting arm 144 is suitably connected to the inner end of a flash connector receptacle 148 of conventional type, suitable insulation being provided between flash contact arm 144 and the shutter housing.

The operation of the shutter

With the various elements of the shutter and diaphragm assembly in the position shown in Fig. 1, all the parts thereof are at rest, the shutter being cocked and ready for use. During operation of the shutter, the actuating portion 102 of the tripping lever 42 is engaged by the camera user and rotated in a clockwise direction around pivot pin 100, thus compressing the cocking spring 124. This clockwise rotation of tripping lever 42 moves the latch release arm 104 towards the shutter blade 24. As arm 104 moves, the kicker-engaging surface 108 carried thereby also moves towards the shutter blade, thus allowing the kicker spring 38 to rotate the kicker-carrying arm 110 in a clockwise direction around pivot pin 100 from the position shown in Fig. 1 to the position shown in Fig. 3. In Fig. 3 it can be seen that kicker arm 112 has been moved into position behind shutter blade lug 60 so as to be able to transmit a kicking impulse to the shutter blade when the kicker is released. When the kicker-carrying arm 110 engages the stop 134, this arm can no longer rotate. Continued clockwise rotation of the tripping lever 42 disengages the surface 108 from the kicker arm 114 and moves the latch-engaging surface 106 into engagement with the latch 40. This position of the various elements is shown in Fig. 3. At this point, the kicker is still held by the hook 131 on the end of latch 40, the kicker being held by the latch against the bias of spring 38. It should also be noted that, during the above-described movement of the elements, latch 40 has been rotated in a counterclockwise direction around its pivot pin 130 against the bias of its spring 132.

Continued clockwise rotation of the tripping lever 42 past the position shown in Fig. 3 causes the latch-engaging surface 106 to lift the latch 40 so that the hook 131 thereon clears the tab 116 on kicker arm 112, thereby releasing the kicker for rapid rotation by kicker spring 38. As the kicker rotates, arm 112 thereof strikes the left side of lug 60, as seen in Fig. 3, and imparts a sharp impulse to lug 60, the kicker arm being disengaged from lug 60 after the lug 60 has moved through a small predetermined arc. The impulse applied by the kicker arm 112 to the shutter blade is amply strong to disengage the lug 62 from magnet 46 and to rotate the shutter blade 24 in a counterclockwise direction around its bearing 26. Rotation of shutter blade 24 continues till the right-hand side of lug 60 strikes the first bounce spring positioned in the arcuate path of travel of lug 60. This bounce spring, which would be spring 28 with the diaphragm cam 90 in the position shown in Fig. 1, returns the shutter blade 24 to its initial position overlying the diaphragm aperture. As the shutter blade returns, the magnetic portion 63, carried by lug 62 thereon, strikes magnet 46, this magnet moving slightly under this impulse. The energy of this return impulse is absorbed partially by the yielding block 49 and partially by the frictional mounting of the magnet, bouncing of the shutter as it returns to its initial position being thereby avoided.

When the kicker rotates during its application of the kicking impulse to lug 60, the second arm 114 of the kicker engages the inclined surface 146 of the spring contact arm 144 and moves the flash contact 142, carried by this arm, into contact with the ground contact 143, thus closing the flash bulb firing circuit. This phase of the kicker operation is shown best in Fig. 4, where portions of the latch 40 and the latch release arm 104 are shown in dotted lines. Due to the fact that the end of kicker arm 114 strikes the inclined surface 146 with a grazing motion there is no sharp impact which might cause arm 114 to be reversed in its movement. Therefore there is no possibility of any consequent chattering of the switch contact 142. The springiness of arm 144, along with the grazing contact by the arm 114, serves as a means for relatively gradually absorbing the kinetic energy of the kicker arm 114 and thus relatively gradually slowing this arm 114.

When the actuating portion 102 of the tripping lever is released by the camera user at the end of an exposure, the cocking spring 124 rotates the tripping lever 42 in a counterclockwise direction around the pivot pin 100. This moves the kicker-engaging surface 108 away from its Fig. 4 position to its Fig. 1 position. It should be noted that spring 38, due to its arrangement with respect to the two pivots 109 and 100, has a relatively strong bias preventing rotation of kicker 36 in a counterclockwise direction around pivot 109 and a rather weak bias preventing a counterclockwise rotation of kicker-carrying arm 110 around pivot 100. Therefore, the first part of the counterclockwise movement of kicker-engaging surface 108, associated with the tripping lever 42, rotates kicker-carrying arm 110 in a counterclockwise direction until arm 110 hits stop 136. During this motion, the latch-engaging surface 106 on arm 104 also rotates in a counterclockwise direction, thereby allowing latch 40 to be rotated in a clockwise direction around its pivot 130 by means of bias spring 132 until latch 40 hits stop 133. Further counterclockwise movement of the kicker-engaging surface 108 rotates the kicker 36 around its pivot 109. Since the kicker-carrying arm 110 is now in the Fig. 1 position the rotation of kicker 36 swings the end of kicker arm 112 in an arc which is spaced from the kicker lug 60. As the end of this arm 112 swings, tab 116 carried thereby lifts the latch 40 till the position of Fig. 1 is reached, whereupon the hook 131 moves into the latched position.

The time exposure latch

Figure 5:
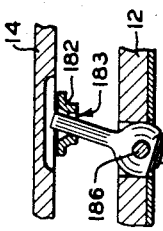
Fig. 5 is a fragmentary sectional view of the shutter and diaphragm assembly of Fig. 1 taken along the line 5—5 of Fig. 1.

The time exposure latch is shown best in Figs. 4 and 5 and generally comprises a member movable into the path of the shutter blade, this member being effective to prevent return movement of the shutter blade to aperture-covering position. The time exposure latch is preferably so associated with the tripping lever that return of the tripping lever to cocked position, under influence of the cocking spring, returns the time latch to inoperative position. With this arrangement the time exposure latch is automatically rendered ineffective after each use so that the camera operator will not inadvertently make a second time exposure instead of an "instantaneous" exposure. As seen in Fig. 4, the tripping lever 42 also includes an arm 160 for actuating the time exposure latch. Arm 160 carries, near its outer end, a pivot pin 162 which rotatably supports a pawl 164. A bias spring 166 urges the pawl 164 in a clockwise direction around pivot 162.

The time exposure latch, indicated generally at 168, comprises a pivot pin 170 rotatably supporting a movably mounted member 172, this member carrying an ear 174 and a cam surface 176. At the other end of member 172 there is provided a detent 178 which is adapted to engage one of two depressions in a detent spring 180 suitably connected to the shutter housing 12. The time exposure latch 168 also includes a second member 182, this second member being preferably integral with member 172 and having a hole 183 at one end thereof (see Fig. 5). This hole 183 is adapted to receive the inner end of a knob 184 which preferably extends through the front shutter housing 12 so as to be operable from the front of the shutter housing. Knob 184 is carried by a pivot pin 186. For forming the shutter blade-engaging portion of the time exposure latch 168, there is provided a pair of springs 188 and 190. Spring 188 is a relatively strong spring and the spring 190 is a relatively weak spring. As can be seen, the outer end of strong spring 188 is substantially normal to the path of travel of shutter blade lug 60, while weak spring 190 is nearly tangential to the path of travel of the lug 60.

When a time exposure is desired, the time latch knob 184 is moved to cause a rotation of the two members 182 and 172 around the pivot pin 170 in a counterclockwise direction. This rotation swings the springs 188 and 190 into the arcuate path followed by the shutter blade lug 60. When the shutter blade 24 is rotated, the lug 60 engages weak spring 190 with a grazing motion and sweeps past spring 190 till it hits spring 188 and rebounds therefrom. As the shutter blade rebounds it strikes the outer end of spring 190 and is held thereby as long as the tripping lever 42 is held in its tripped position. While the hair spring 58 has normally no appreciable effect on the shutter blade rotation, it is biased by the counterclockwise rotation of the shutter blade and thus tends to rotate the shutter blade in a clockwise direction when the shutter blade is held by the spring 190. When the tripping lever 42 is released at the end of the time exposure, the cocking spring 124 rotates the tripping lever in a counterclockwise direction, thus moving pawl-carrying arm 160 also in a counterclockwise direction. As a result of this movement, pawl 164 engages ear 174 and rotates member 172 in a clockwise direction. This rotation moves the detent 178 from the outer notch in detent spring 180 to the inner notch. As detent 178 enters the inner notch in detent spring 180, the inclined surface of this notch continues rotation of the detent until it is completely seated in this notch. This completes the rotation of the member 172, thereby moving the outer end of spring 190 radially with respect to the lug 60 and disengaging this end of spring 190 from the lug 60. The hair spring 58 now rotates the shutter blade 24 in a clockwise direction back to its initial position where it is held by engagement of the magnetic portion 63 with the magnet 46.

During the latter part of the clockwise rotation of member 172, the cam surface 176, carried by the member 172, engages a corresponding surface on the pawl 164 and rotates pawl 164 in a counterclockwise direction around its pivot 162 against the bias of spring 166. The time exposure latch 168 is now in a position where it is ineffective to stop the rotation of shutter blade 24 until this time latch is manually reset. When the time latch 168 is in this ineffective position, the operation of the tripping lever 42 does not affect the time latch since the cam surface 176, on the member 172, holds the end of pawl 164 so that it cannot engage the ear 174. It should be noted in this connection that, when the time latch member 172 is rotated to its shutter blade-engaging position, the cam surface 176 bears on the corresponding surface of pawl 164 and rotates pawl 164 to the left until the ear 174 has passed the outer end of pawl 164.

While a preferred form of the invention has been described above, numerous modifications thereof may be made without departing from the scope of the invention. For example, the lug 60 on the shutter blade may include a resilient portion adapted to engage the reversing members. In this case the bounce springs 28, 30, 32 and 34 could be replaced by relatively rigid reversing members. Additionally, the block 120 for adjusting the bias on kicker spring 38 may be made widely adjustable so as to increase the number of possible exposure times without increasing the number of bounce springs. Similarly, the spring 38 may be replaced by two springs, one of these being a weak spring for exerting a counterclockwise bias to arm 110 around pivot pin 100 and the other being a strong spring for exerting a clockwise bias to kicker 36 around pivot pin 109. In still other modifications of the invention, the flash circuit contact arm 144 may be arranged so as to be contacted by kicker arm 112 rather than by kicker arm 114, while the lugs 60 and 62 may be placed on the counter-balance portion of the shutter blade. Numerous other modifications of the invention will be apparent to those skilled in the art in view of the teachings herein.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera shutter assembly comprising a housing, means providing an exposure aperture for said housing and a shutter blade pivotally mounted within said housing for movement between a closed position at which said shutter blade covers said aperture and an open position at which said shutter blade uncovers said aperture, a mechanism for causing movement of said shutter blade into open position, said mechanism comprising a tripping lever, a mounting arm, said tripping lever and said mounting arm being mounted independently for pivotal movement in said housing about a first axis, a bell crank mounted at its apex for pivotal movement on said mounting arm about a second axis, said bell crank having a kicker arm and a control arm, resilient means for biasing said mounting arm for movement in a first direction about said first axis and for biasing said bell crank for movement in a first direction about said second axis, a first portion of said tripping lever being adapted to abut against said control arm in order to urge said mounting arm in a second pivotal direction about said first axis and to urge said kicker arm in a second pivotal direction about said second axis, a latch mounted in said housing for pivotal movement about a third axis, resilient means for biasing said latch for movement in a first pivotal direction about said third axis, said latch being capable of catching said kicker arm in order to limit movement of said bell crank in said one direction about said second axis and to limit movement of said mounting arm in said one direction about said first axis, a second portion of said tripping lever being adapted to be moved into abutment with said latch in order to move said latch in a pivotal direction about said third axis, whereby said first portion of said tripping lever is moved out of abutment with said control arm, said mounting arm is free to pivotally move in said one direction about said first axis and said kicker arm is thereby carried toward said shutter blade and is free to pivotally move in said first direction about said third axis in order to impart an aperture-uncovering force to said shutter blade, a bulb lever mounted for pivotal movement about a fourth axis on said housing between a first position and a second position, said bulb lever having a hook catch and a stop catch, the free ends of which are clear of the path of movement of said shutter blade when said bulb lever is in said first position and which retain said shutter blade in open position when said bulb lever is in said second position, a release lever mounted for pivotal movement about a fifth axis on said tripping lever, a manually engageable knob for moving said bulb lever from said first position to said second position, said release lever returning said bulb lever to said first position automatically when said tripping lever is moved in said second direction.

2. In a camera shutter assembly comprising a housing, means providing an exposure aperture for said housing and a shutter blade mounted within said housing for movement between a closed position at which said shutter blade covers said aperture and an open position at which said shutter blade uncovers said aperture, a mechanism for causing movement of said shutter blade into open position, said mechanism comprising a tripping lever, a mounting arm, said tripping lever and said mounting arm being mounted independently for pivotal movement in said housing about a first axis, a bell crank mounted at its apex for pivotal movement on said mounting arm about a second axis, said bell crank having a kicker arm and a control arm, a first spring for biasing said mounting arm in a first direction about said first axis and for biasing said bell crank for movement in a first direction about said second axis, a second spring for biasing said tripping lever for movement in a first direction about said first axis, a first portion of said tripping lever, when said tripping lever is moved in said first direction about said first axis, being adapted to abut against said control arm in order to urge said mounting arm in a second pivotal direction about said first axis and to urge said kicker arm in a second pivotal direction about said second axis, a latch mounted in said housing for pivotal movement about a third axis, a third spring for biasing said latch for movement in a first pivotal direction about said third axis, said latch being capable of catching said kicker arm in order to limit movement of said bell crank in said one direction about said second axis and to limit movement of said mounting arm in said one direction about said first axis, said kicker arm being spaced from said shutter blade when caught by said latch a second portion of said tripping lever, when said tripping lever is moved in a second direction about said first axis, being adapted to be moved into abutment with said latch in order to move said latch in a second direction about said third axis whereby said first portion of said tripping lever is moved out of abutment with said control arm, said mounting arm is free to move pivotally in said first direction about said first axis and said kicker arm is thereby carried toward said shutter blade and is free to move pivotally in said first direction about said third axis in order to impart an aperture-uncovering force to said shutter blade, a bulb lever mounted for pivotal movement about a fourth axis on said housing between a first position and a second position, said bulb lever having a hook catch and a stop catch, the free ends of which are clear of the path of movement of said shutter blade when said bulb lever is in said first position and which retain said shutter blade in open position when said bulb lever is in said second position, a release lever mounted for pivotal movement about a fifth axis on said tripping lever, a manually engageable knob for moving said bulb lever from said first position to said second position, said release lever being adapted to return said bulb lever to said first position automatically when said tripping lever is moved in said first direction about said first axis.

3. The improved mechanism in the camera shutter assembly of claim 2 wherein said tripping lever is provided with a manually engageable portion extending through said housing.

4. The improved mechanism in the camera shutter assembly in claim 2 wherein said pair of catches include a first catch which is generally L-shaped, one leg of said first catch being affixed to said bulb lever and the other leg of said first catch extending into the path of movement of said shutter blade in order to arrest advancement of said shutter blade when said bulb lever is in said second position, and a second catch in the form of a substantially straight resilient element one end of which is affixed to said bulb lever and the other end of which extends into the path of movement of said shutter blade when said bulb lever is in said second position so that said shutter blade, when moving into aperture-uncovering position, brushes past the other end of said second catch and is prevented from moving back into aperture-covering position by said other end of said second catch.

5. The improved mechanism in the camera shutter assembly of claim 2 wherein said bulb lever is provided with a detent portion, and wherein a leaf spring affixed to said housing is provided with a pair of notches into one of which said detent portion is adapted to project, said bulb lever being in said first position when said detent portion projects into one of said notches and being in said second position when said detent portion projects into the other of said notches.

References Cited in the file of this patent

UNITED STATES PATENTS

| | | |
|---|---|---|
| 359,715 | DeRibas | Mar. 22, 1887 |
| 1,124,313 | Pierman | Jan. 12, 1915 |
| 1,917,330 | Riddell | July 11, 1933 |
| 2,315,279 | Simmon | Mar. 30, 1943 |
| 2,391,157 | Harvey | Dec. 18, 1945 |
| 2,398,409 | Carroll | Apr. 16, 1946 |
| 2,531,936 | Fairbank et al. | Nov. 28, 1950 |